Feb. 28, 1928.
W. W. KLEMM
1,660,619
SCRAPER FOR WATER FILTERS
Filed June 26, 1926 2 Sheets-Sheet 1
Fig. 1.
Fig. 2.
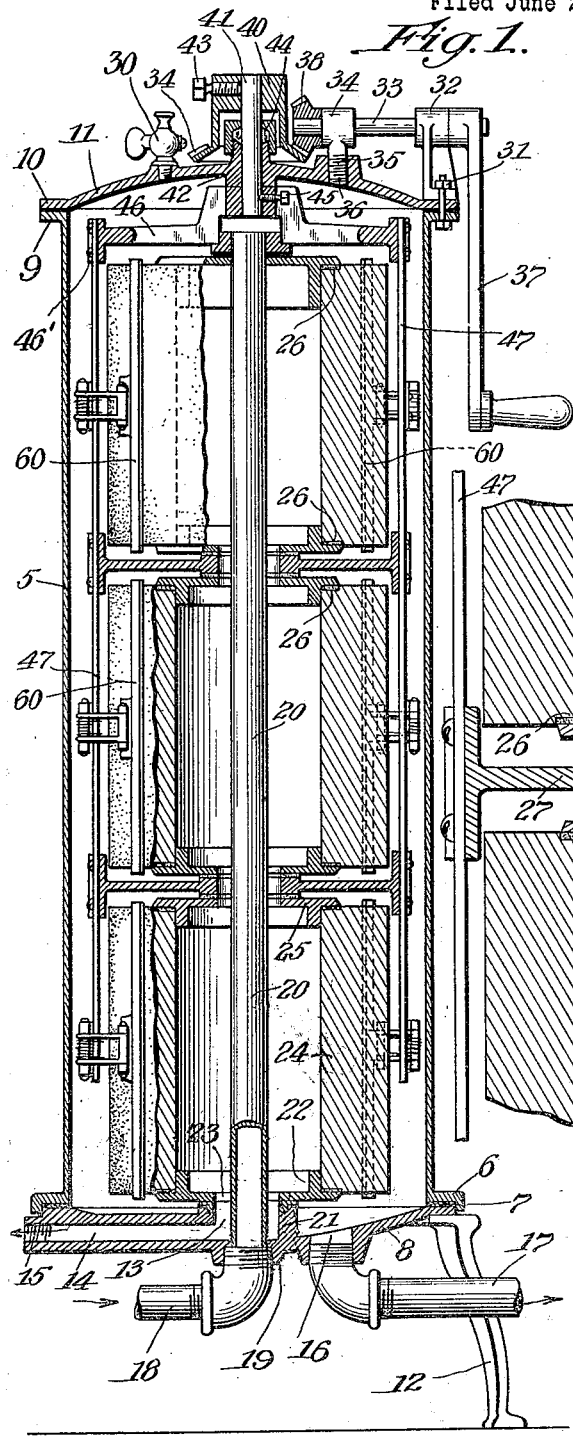
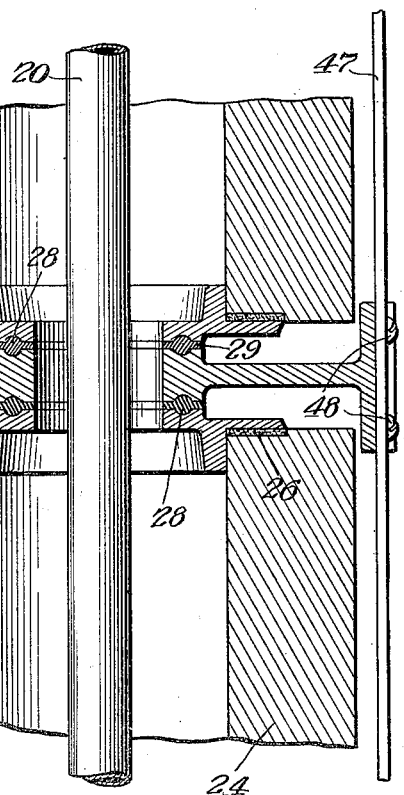
Inventor:
William W. Klemm.
By Mason Fenwick & Lawrence
Attys.

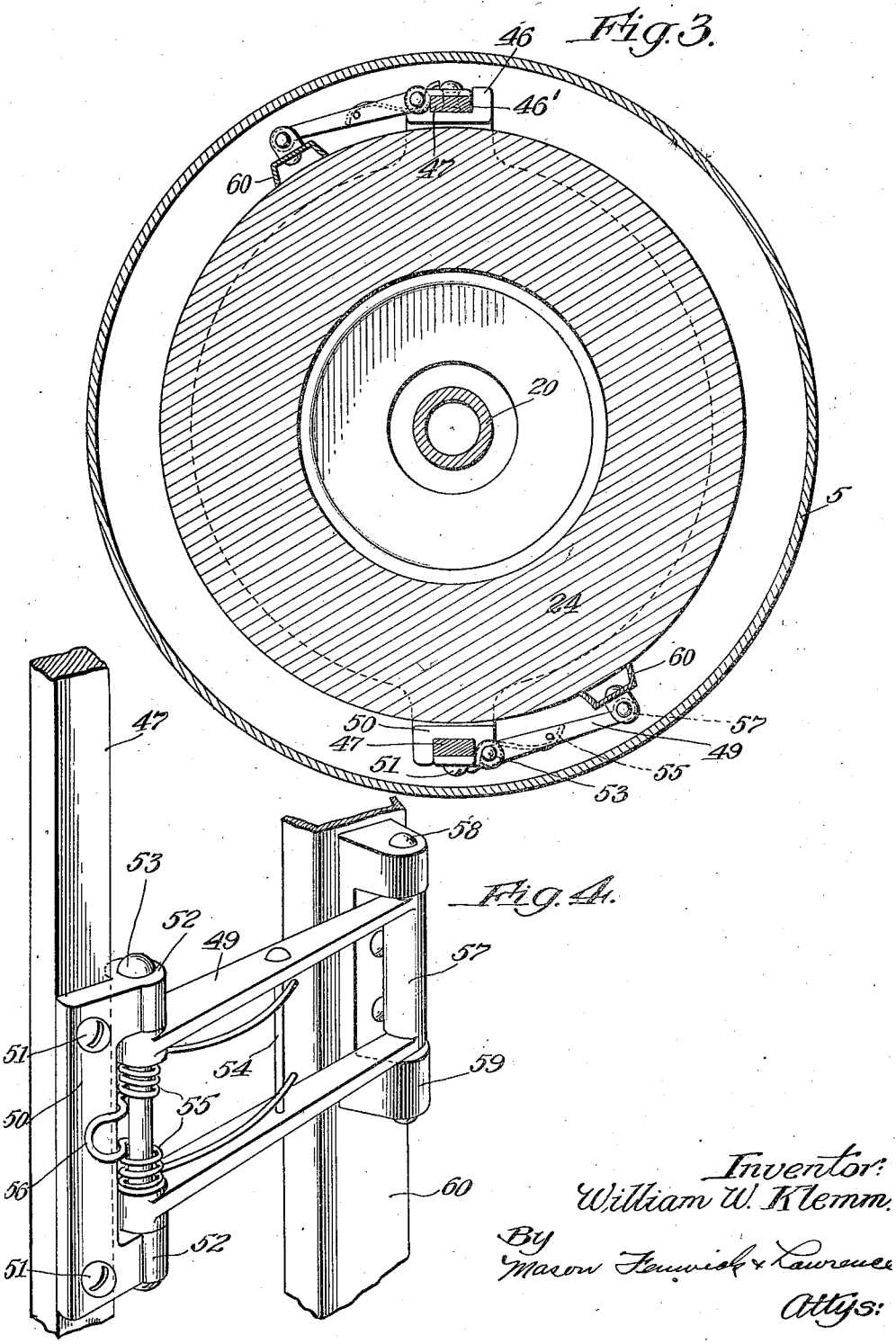

Patented Feb. 28, 1928.

1,660,619

UNITED STATES PATENT OFFICE.

WILLIAM W. KLEMM, OF CHICAGO, ILLINOIS.

SCRAPER FOR WATER FILTERS.

Application filed June 26, 1926. Serial No. 118,776.

This invention relates to filters and more particularly to water filters of the type employing stone especially in the form of tripoli as a filtering medium through which the water is passed for the purpose of removing all disease germs, animal and vegetable matter in suspension and other impurities, but allowing the soluble salts and free oxygen necessary to the human system to remain, supplying a pure, fresh an aerated water.

The object of the invention is to provide a novel construction of water filter embodying a filtering stone made of sections joined in a novel way to prevent leakage at the ends thereof so that all of the water will pass through the stone and be thoroughly filtered, and to provide novel scrapers for removing the impurities and scraping the external surfaces of the filtering stones or mediums simultaneously, as well as to provide independent scrapers or spring pressure means for each stone whereby the pressure thereon is uniform, the construction is simplified, manufacture facilitated, and the value and sufficiency of operation of devices of this character generally enhanced.

With the above and other objects in view, the invention consists of certain novel combinations and arrangements of parts to be hereinafter more particularly specified and pointed out in the appending claims.

In the drawings:

Figure 1 is a longitudinal sectional view partly in elevation of my improved water filter.

Figure 2 is an enlarged fragmentary longitudinal sectional view thereof showing the manner of joining two filtering mediums or stones.

Figure 3 is a horizontal cross-sectional view at right angles to the axis of the filter and stones, and Figure 4 is an enlarged fragmentary perspective view showing the manner of mounting the scrapers for simultaneous operation and the spring pressed arms thereof.

Referring to the drawings in detail, in which like reference characters designate corresponding parts throughout the several views, the improved water filter is shown as embodying a case or tank 5 preferably of elongated cylindrical form disposed in an upright position and having a bottom flange 6 of angular formation secured in water tight connection by means of a packing 7 with a bottom 8 and having a flange 9 at its upper end joined in water-tight connection with a flange 10 of a top wall or section 11.

The bottom 8 forms a base and is adapted to be supported in spaced relation to the floor as by means of legs 12. The top and bottom walls are preferably of concavo-convex construction in cross-section and bulge outwardly. The bottom has a central or axial outlet 13 from which leads a lateral radial outlet pipe or passage 14 preferably internally threaded at its outer end as indicated at 15 for a connection with a faucet (not shown) or other means by which the filtered water may be drawn off. A waste or flush outlet 16 is also provided in the bottom outwardly of the annular wall or flange producing the outlet 13 for filtered water and has an outlet or flush pipe 17 connected thereto and leading to a drain pipe or sewer, such as through the usual down pipe. The inlet for water from the main is through an inlet pipe 18 which leads laterally or radially from the side and centrally through the bottom 8, connection being made through the outwardly extending internally threaded flange 19, while a pipe 20 connects therewith and extends up through the filtered water outlet 13 providing an annular passage around the same, the inlet pipe 20 being imperforate and leading to a point near the top 11.

The flange around the outlet 13 is designated at 21 and forms a support for an annular flanged plate 22 having a central outlet aperture 23 and upon which a cylindrical hollow or tubular filtering stone 24 or other medium such as tripoli, is mounted. A similar plate 25 is provided at the upper end of the stone, a plurality of these stones, preferably three in number being provided in the case as will be seen in the drawings. Beneath the top stone and between adjacent ends of pairs of stones are provided corresponding plates and these have interposed packing gaskets 26 to prevent escape of the water and prevent the stones from breaking. In addition, interposed plates 27 are provided between the flanged plates 25, the same having their inner portions correspondingly apertured and their opposed edges recessed as indicated at 28 to take interposed packing gaskets 29 preferably of some non-corrosive metal which serves to join the plates, although it is obvious that any other suitable form of packing may be provided, such as leather or rubber. It is preferred that lead or some similar substance be used as the packing 29.

At the top 11 is provided an air outlet cock 30, and the flanges 9 and 10 are bolted together as indicated at 31. The bolts 31 serve to mount a bearing bracket 32 in which a shaft 33 is journalled in conjunction with a bracket 34 having a screw shank 35 threaded in an opening 36 in the top 11, the shaft having a crank handle 37 on its outer end whereby the shaft may be rotated. The inner end of the shaft carries a beveled pinion or miter gear 38 in connection with a similar gear 39 which may be formed as an outwardly extended flange at the lower end of a cap or flanged hub 40 which is keyed to a shaft 41 journalled vertically in a bearing sleeve 42 axially or centrally of the top 11 as by means of a set screw 43. A packing gland 44 is provided on the threaded upper end of the bearing sleeve or hub 42 to prevent the escape of water, suitable interposed packing material being provided. The lower end of the shaft 41 projects below the bearing sleeve 42 and has keyed thereto as by means of a set screw 45, a spider or casting having a series of radial spokes or arms 46, the outer ends of which are elongated vertically and grooved as at 46' to receive the upper ends of rectangular rods 47. Corresponding grooved outer portions are provided on the plates 27 and fastening screws or other suitable fastening means 48 are provided to secure the rods in the grooves 46' in such a manner as to extend from the top to the bottom of the case and along all of the filtering stones. Hinged bracket arms 49 have their plates or leaves 50 secured to the rods 47 as indicated at 51 and have spaced ears 52 receiving the pintles 53 on which the arms 49 are pivoted. The arms 49 are connected by cross-pins 54 and double coiled springs 55 are mounted on the pintles 53 and have bight or bent portions 56 forming arms bent over and against the outer faces of the hinged leaves 50 while the spaced ends of these springs are curved and bent over the cross pins 54. At the free ends of the arm 49, sleeves 57 are provided to receive pivot pins 58 on which U-shaped brackets 59 are pivoted, the brackets carrying channel-shaped or other metallic scrapers 60, which may be made to carry suitable abrasive means if desired. The springs or spring arms thus serve to press the scrapers against the external surfaces of the filtering stones and when the crank handle 37 is rotated, rotation will be simultaneously imparted to all of the scrapers through the connecting rods 47 so that all of the filters may be quickly and simultaneously cleaned to remove the impurities therefrom. Of course, it is to be understood that the interior of the case and the filters are suitably flushed and the impurities and other foreign matter collecting on the external surfaces of the stones and removed therefrom by the scrapers and flushing, may be drained and carried off through the flush outlet pipe 17. However, in use, the water is discharged from the upper end of the pipe 20 at the top of the case and passes inwardly through the filtering stones to be drawn off through the filtered water outlet 14 in a pure condition.

A device constructed in accordance with this invention greatly facilitates the scraping of the stones and obviates the removal and independent scraping thereof, as well as facilitates the mounting of the stones and obviates the necessity of employing a single large stone which is very expensive and cumbersome to handle as well as likely to crack or break owing to the soft material employed in the same. Obviously, if one of the smaller stones should crack or break from the pressure of the water or due to back pressure, the expense incident for renewal thereof is considerably reduced and the cost of upkeep correspondingly lower. The device will be found efficient in operation and overcomes many of the disadvantages of former constructions.

While I have described my invention in a specific form, it is to be understood that certain changes in the arrangement, construction and proportions of the parts may be resorted to without departing from the spirit and scope of the invention as will be defined by the claims appended hereto.

I claim:

1. In a water filter, a plurality of cylindrical filtering stones, said stones being arranged in alinement end-wise and having flanged plates fitting in the ends thereof arranged in alinement and apertured centrally, interposed packings between the plates, and additional plates between the flanged plates having arms projecting between and outwardly thereof, scrapers for the stones supported by said arms outwardly of the stones and means for simultaneously actuating the scrapers against the stones.

2. In a filter, a case having an inlet for unfiltered water and an outlet for filtered water, a filtering medium therein, comprising a plurality of cylindrical stones, plates abutting the ends of said stones and having flanges fitting internally thereof, said plates being disposed in spaced relation with interposed packings between the same and the stones and between each other, and apertured plates between the packings of the flanged plates and having arms projecting outwardly, and a plurality of scrapers for said medium supported by said arms and adapted to be simultaneously actuated.

3. In a water filter, a case having a water inlet and an outlet for filtered water, a plurality of scraper stones of cylindrical form mounted in the case with spaces therebetween and through which the water is adapted to pass for filtering the same, flanged plates fitting opposite ends of said stones with interposed packing, the uppermost plate being closed against the escape of water and the intermediate and bottom plates being apertured, plates disposed between said first named plates with interposed packings and correspondingly apertured, and having flanged arms at their periphery, a plurality of scrapers supported by said flanged arms and engaging said stones, and gear means for actuating said scrapers.

4. In a water filter, a case having a water inlet and an outlet for filtered water, a plurality of scraper stones of cylindrical form mounted in the case arranged in end-wise relation and spaced apart, and through which the water is adapted to pass for filtering the same, apertured supporting means arranged between said plates with interposed packings and projecting between and outwardly of the plates, a plurality of scrapers supported by said supporting means outwardly of the stones and engaging said stones, and means at the top of the case and having connection with all of the scrapers for simultaneously actuating the same.

5. In a water filter, a case, an inlet for unfiltered water to the case, an outlet for filtered water from the case, a plurality of hollow annular filtering stones within the case and supported against movement, interposed packing means between the stones and inter-communicating for the passage of water, said packing means including plates fitting the ends of the stones and engaging internally thereof, apertured supporting means between said plates and forming a continuity of communication between the stones, and having cross arms outwardly of the stones and scrapers supported by said cross arms and engaging said stones and adapted to be moved thereagainst.

6. In a water filter, a case, an inlet for unfiltered water to the case, an outlet for filtered water from the case, a plurality of hollow annular filtering stones within the case and supported against movement, interposed packing means between the stones and inter-communicating for the passage of water and including plates fitting the ends of the stones with central openings for the flow of water therethrough, interposed supports in waterproof contact with said plates and projecting outwardly of the stones, rods running longitudinally along the external surfaces of the stones and supported by said interposed supporting means outwardly of the stones, scrapers carried by said rods, and means for simultaneously actuating said rods to rotate the scrapers on the stones.

7. In a water filter, a case, an inlet for unfiltered water to the case, an outlet for filtered water from the case, a plurality of hollow annular filtering stones within the case and supported against movement, interposed packing means between the stones and inter-communicating for the passage of water and including a plurality of interposed plates and packing means therebetween, said plates fitting the ends of the stones and having interposed supporting members projecting outwardly of the plates, rods running longitudinally along the external surfaces of the stones and supported by said interposed plates parallel to the peripheral spaces of the stones, scrapers carried by said rods, a shaft having arms connected to the rods, and gear means at the top of the case connected to the arms for simultaneously actuating the scrapers against the external surfaces of the stones.

8. In a water filter, a case, an inlet for unfiltered water to the case, an outlet for filtered water from the case, a plurality of hollow annular filtering stones within the case and supported against movement, interposed packing means between the stones and inter-communicating for the passage of water and including flanged plates of angular formation fitting the ends of the stones and having central openings, other plates snugly fitting between the first named plates with interposed packings and having corresponding central openings, and peripheral portions projecting between the stones and outwardly thereof with cross arms for supporting the rods, rods running longitudinally along the external surfaces of the stones, scrapers carried by said rods and means for simultaneously actuating said rods to rotate the scrapers on the stones, said scrapers being spring pressed against the external surfaces of the stones.

In testimony whereof I affix my signature.

WILLIAM W. KLEMM.